United States Patent [19]

Shikinami et al.

[11] 4,142,956
[45] Mar. 6, 1979

[54] PROCESS FOR PRODUCING AN OPEN CELL FOAM

[75] Inventors: Yasuo Shikinami, Kusatsu; Kosuke Iida, Osaka; Kunihiro Hata, Osaka; Fumio Kasajima, Osaka, all of Japan

[73] Assignee: Takiron Co., Ltd., Osaka, Japan

[21] Appl. No.: 808,578

[22] Filed: Jun. 21, 1977

[30] Foreign Application Priority Data

Jul. 21, 1976 [JP] Japan .................... 51-87553

[51] Int. Cl.² .............................. B01J 1/10; B01J 1/12
[52] U.S. Cl. ............................ 204/159.14; 204/159.2; 204/159.18; 260/876 R; 260/889; 260/890; 260/892; 260/894; 521/89; 521/95; 521/140; 521/915
[58] Field of Search .................... 260/2.5 HA, 2.5 HB; 204/159.2, 159.14, 159.18

[56] References Cited

U.S. PATENT DOCUMENTS

| | | | |
|---|---|---|---|
| 3,098,831 | 7/1963 | Carr | 260/2.5 HA |
| 3,240,727 | 3/1966 | Scalari | 260/2.5 HA |
| 3,542,702 | 11/1970 | Okada et al. | 260/2.5 HA |
| 3,562,367 | 2/1971 | Shimohara et al. | 204/159.2 |
| 3,709,806 | 1/1973 | Minami et al. | 260/2.5 HA |
| 3,717,559 | 2/1973 | Oyama et al. | 260/2.5 HA |
| 3,816,284 | 6/1974 | Kagiya et al. | 260/2.5 HA |
| 3,891,724 | 6/1975 | Yaeda et al. | 260/2.5 HA |
| 3,981,830 | 9/1976 | Takeuchi et al. | 260/2.5 H |
| 4,029,840 | 6/1977 | Shikinami et al. | 204/159.17 |

Primary Examiner—Morton Foelak
Attorney, Agent, or Firm—Sughrue, Rothwell, Mion, Zinn and Macpeak

[57] ABSTRACT

A process for producing an open cell foam by irradiating a composition comprising (a) a thermoplastic resin polymer blend including 1,2-polybutadiene as one component, (b) a photosensitizing agent and (c) a thermally decomposable foaming agent, with ultraviolet light having a wavelength ranging from about 254 to about 400 m$\mu$ to thereby cross-link mainly the 1,2-polybutadiene, and subsequently foaming the composition at a temperature higher than the softening point of the 1,2-polybutadiene and that of the thermoplastic resin polymer blended therewith and higher than the decomposition temperature of the foaming agent.

10 Claims, No Drawings

PROCESS FOR PRODUCING AN OPEN CELL FOAM

BACKGROUND OF THE INVENTION

1. Field of the Invention

The present invention relates to a process for producing a polymeric material open cell foam utilizing the decomposition of a foaming agent. That is, in the present invention, a thermoplastic resin polymer blend system containing a photosensitizing agent and a thermally decomposable foaming agent and containing 1,2-polybutadiene as one component is irradiated with ultraviolet light to cross-link mainly the 1,2-polybutadiene, and then the composition is heated to a temperature higher than the softening point of the 1,2-polybutadiene and the softening point of the thermoplastic resin polymer blended therewith and higher than the decomposition temperature of the foaming agent to form an open cell foam.

A main aspect of the present invention is that it enables an open cell foam of a thermoplastic resin polymer utilizing the decomposition of a foaming agent, which has been believed to be difficult, to be easily produced in a practical manner, and that the resulting open cell foam has many uses based on the physical properties of 1,2-polybutadiene and the other thermoplastic resin polymer blended therewith.

2. Description of the Prior Art

Expanded materials or porous materials can generally be classified as having a closed cell foam structure or an open cell foam structure. With respect to uses, too, these cell structure differences give rise to distinctly different uses. For example, a material with a closed cell foam structure is used as a buoyant material, a heat insulating material, a packing material, and the like, whereas a material with an open cell foam structure is used as a filter material, a sound-absorbing material, and the like. On the other hand, both types of materials are used as a cushioning material.

Polymer material foams can be classified as in the following Table 1 according to the processes for producing closed cell foams and open cell foams.

Table 1

| Classification of Polymer Material Foam Forming Processes | | |
|---|---|---|
| Foaming Process | Closed Cell Foam | Open Cell Foam |
| Gas-Mixture Process | PVC (Airex process) | PVC (Elastomer process, etc.), Rubber (soft; Dunlop process) |
| Foaming Agent-Decomposition Process | | |
| Ordinary-pressure Foaming Process | PE (radiation cross-linking process, chemical cross-linking process) PP (radiation cross-linking process) PVC (leather) Rubber (soft; Talalay process) Silicone, Glass | |
| Extrusion Foaming Process | PE, PP, PVC, ABS, etc. | |
| Press Foaming Process | PE, PP, PVC (Kleber process) Acryl Resin, Rubber (hard) | |
| Injection Foaming Process | Various Thermoplastic Resin Polymers | |
| Solvent-Vaporization Process | | |
| Within-Mold Foaming Process | PS (Beads process) | |
| Extrusion Foaming Process | PE, PS, Various Thermoplastic Resin Polymers (Celka process) | |
| Two Liquid-Mixture Process | Epoxy Resin, Silicone (pyranyl) | Phenol Resin, Urea Resin |
| Chemical Reaction Process | Polyurethane (hard) | Polyurethane (soft) |
| Elution Process | | PE, PVC, Vinylon, Viscose |
| Sintering Process | | Inorganic, Polyethylene, Nylon, Fluorine-Containing Resin |
| Others | Syntactic | Carbon |

Note:
PVC: polyvinyl chloride
PE: polyethylene
PP: polypropylene
ABS: acrylonitrile/butadiene/styrene
PS: polystyrene
(From Maki et al., Plastic Foam Handbook, published by Nikkan Kogyo (February 28, 1973))

This Table shows that there is absolutely no industrial process for producing an open cell foam utilizing a foaming agent-decomposition process. The present invention provides a novel process in this field which is industrially practical.

The mechanism of the formation of an open cell foam is described below. According to the elution process, a base resin is filled with a soluble material, and then the soluble material is extracted therefrom. This process is suitable for producing porous bodies having fine pores, since the size of the soluble filler becomes the size of resulting cells. The void ratio is decided by the amount of the filler. Use of too much filler would destroy the cells, whereas when too little filler is used the cells would not be connected to each other, resulting in filler remaining and formation of unexpanded products. Therefore, with the elution process, only cellular materials having a low expansion ratio of a comparatively narrow range are obtained. In addition, the extraction requires a long time and, thus, the products become extremely expensive.

The sintering process is a process utilizing, as cells, voids formed upon sintering resin particles. When the viscosity upon sintering is too low, voids are filled and closed with the fluid particles, resulting in a failure to form an open cell material. Therefore, this process can be applied only to resins which are sintered to each other and for which fluidized deformation does not occur. In this case, the ratio of cell volume to cell wall depends upon the size of particles. Since there is a physical limit to the particle size of the resin particles, there is a limit to the void ratio. Thus, this process provides only cellular materials of a comparatively low expansion ratio.

These above two processes can also be practically applied, although slightly, to general-purpose thermoplastic resin polymers of polyethylene and polyvinyl chloride. However, the application of these two processes is not economically advantageous.

The gas-mixture process, the two liquid-mixture process, and the chemical reaction process are essentially processes of adjusting the relationship between the viscosity of a resin and the gas pressure. Of these, the gas-mixture process is a process comprising mechanically mixing an inert gas into a surface active agent-containing slurry resin at a low temperature and under high pressure by stirring at high speed to thereby disperse and absorb the gas in the slurry, and then allowing the resin to foam due to the expansion of the gas. This process can be used in producing an open cell foam from a paste-like polyvinyl chloride and rubber latex. This process is applicable only where a resin slurry can be prepared.

In the two liquid-mixture process as an example of the solvent-vaporization process, a volatile foaming agent is added to a liquid resin and, under stirring at high speed, a hardening agent is added. Thus, the foaming agent is vaporized away due to the reaction heat of hardening, thus forming an expanded material. The cells are finally stabilized by the solidification of the resin. This process can be used with hardenable resins such as phenol resins and urea resins.

Further, the chemical reaction process is represented by the process for producing a polyurethane foam, and is a process of incorporating in gas produced simultaneously with the polymer-forming reaction.

As is described above, suitable processes for producing an open cell foam are inevitably determined by and dependent upon the characteristics of the resins used. However, processes for producing an open cell foam utilizing a foaming agent, which are believed to be extremely advantageous industrially, have not so far been industrially put into practice. In particular, establishment of a process for producing an open cell foam of general-purpose thermoplastic resin polymers utilizing a foaming agent-decomposition process has eagerly been desired.

In general, the foaming agent-decomposition process and the solvent-vaporization process are mainly employed for expanding thermoplastic resin polymers. However, it is difficult to industrially produce an open cell foam of good quality having sufficient commercial value utilizing these processes, although a closed cell foam can easily be obtained.

In general, the mechanism of the formation of an open cell foam using the gas process can be roughly classified into three types: (1) the type wherein materials have an aggregating property such as a urethane and, a solid polyurethane is forced by a gas generated during polymerization to surround a cell and form a cell wall; (2) the type wherein elongation of a polymer material as a solid upon expansion is small, and cells associate with each other to form an open cell foam; and (3) the type wherein cells in an essentially closed cell foam are partly broken when the cells are further expanded to such a degree that the cell wall can no longer resist the gas expansion pressure, thus forming a partly open cell foam. The diffusion coefficient of the gas, the manner of mechanical stirring, the stage and degree of pressure application, and the like greatly influence the cell formation mechanism. In any way, in order to obtain an open cell foam by utilizing the expansion pressure of gas, the system must be solidified to a degree such that, even when the cells are expanded without breaking the cell nuclei to connect the cells together, the cells will not be destroyed and contract.

A sharp reduction in viscosity of thermoplastic resins occurs at a temperature higher than the melting point of the thermoplastic resin. Experimentally it has been shown that the viscosity of a thermoplastic resin polymer is too low to maintain its shape as a molding when a gas is present in a volume about 5 times larger than that of the thermoplastic resin polymer. When the viscosity of the resin forming the cell wall is not sufficient to resist the expansion pressure, the cell wall will be broken, resulting in a contraction of the cells and, in an extreme case, a foam with a low expansion ratio or unexpanded products will be obtained. Therefore, a process in which the viscosity of the resin is increased by cross-linking is employed. The so-called pre-cross-linking procedure preceding foaming and expansion generally provides a high closed cell ratio. A simultaneous cross-linking reduces the gas efficiency, and tends to result in uneven cells. This also provides a high closed cell ratio. A post-cross-linking is useless since the viscosity of the resin is increased after the gas has escaped. Formation of partly open cells by adjusting the degree of pre-cross-linking or the stage and degree of simultaneous cross-linking under application of pressure or under ordinary pressure has been attempted on a laboratory scale. However, the results do not have good reproducibility, and products of good quality have not yet been obtained. In addition, these have been conducted batchwise, and complicated procedures are involved. Thus, productivity is not achieved. These are the great difficulties which have inhibited the practice of the processes on an industrial scale.

SUMMARY OF THE INVENTION

The present invention can be basically described as an approach of adjusting the viscosity in pre-cross-linking. Cross-linking is attained through the physical process of irradiating the composition with ultraviolet light for a short time. Foaming is conducted under ordinary pressure. Therefore, the process of the present invention has extremely excellent productivity. In addition, the cell structure is uniform and reproducibility of production is good. The open cell ratio can be freely varied over a comparatively wide range. Therefore, the process of this invention is excellent industrially.

Accordingly, this invention provides a process for producing an open cell foam, which comprises irradiating a thermoplastic resin polymer blend composition comprising (a) a thermoplastic resin polymer blend including 1,2-polybutadiene as one component, (b) a photosensitizing agent and (c) a thermally decomposable foaming agent, with ultraviolet light of a wavelength of about 254 to about 400 m$\mu$ to cross-link mainly the 1,2-polybutadiene, and subsequently foaming the composition at a temperature higher than the softening point of the 1,2-polybutadiene and that of the thermoplastic resin polymer blended therewith and higher than the decomposition temperature of the foaming agent.

DETAILED DESCRIPTION OF THE INVENTION

Polyethylene, polypropylene, polyvinyl chloride, polystyrene and other generally used plastics do not absorb, if pure, light of a wavelength longer than about 300 m$\mu$. In other words, the electrons of the polymer molecule are not excited by the energy of ultraviolet light of a wavelength longer than about 300 m$\mu$. However, photolysis of these resins occurs when they are exposed to light having a wavelength shorter than about 254 m$\mu$. In general, the quantum yield of molecular bond cleavage obtained when high molecular weight compounds are exposed to light of a wavelength of about 290 to 400 m$\mu$ corresponding to sunlight is as low as about $10^{-3}$ to $10^{-5}$. This range slightly changes depending upon impurities which are present and depending on carbonyl groups formed by oxidation during thermal hysteresis. However, generally used plastics do not essentially respond to light in the near-ultraviolet wavelength region in a short time due to their molecular structure. On the other hand, 1,2-polybutadiene which is used in the present invention tends to be activated by high energy sources such as heat and light, since 1,2-polybutadiene has in each unit a hydrogen atom and a vinyl group attached to the same carbon atom which is a tertiary carbon atom. It is a photodegradable plastic material which comparatively easily undergoes cross-linking and cyclization reactions, for example, upon being irradiated with light of a short wavelength not longer than 350 m$\mu$ to cause a hardening type deterioration. It is known that, with respect to 50 $\mu$ thick 1,2-polybutadiene film (trade name: JSR RB-820; made by Japan Synthetic Rubber Co., Ltd.), the specific amount of irradiation with ultraviolet light required for hardening deterioration is not more than 120 mW.hr/cm$^2$ using light of a wavelength of 254 m$\mu$, 250 mW.hr/cm$^2$ using light of a wavelength of 312 m$\mu$, and 600 mW.hr/cm$^2$ using light of a wavelength of 352 m$\mu$.

As is described above, 1,2-polybutadiene easily responds to light having a wavelength longer than about 300 m$\mu$. Thus, it is clearly different from generally used plastics in sensitivity to ultraviolet light. Addition of a photosensitizing agent to general thermoplastic resin polymers will change the wavelength of light to which they respond and change the sensitivity thereof. This also applies to 1,2-polybutadiene. When a photosensitizing agent is added to a 1,2-polybutadiene thermoplastic resin polymer blend system, the differences in wavelength of light to which the thermoplastic resin polymers respond and in the sensitivity thereof are clearly observed.

When a thermoplastic resin polymer material containing a photosensitizing material is irradiated with ultraviolet light, oxidation or cleavage of the molecular chain predominantly takes place in many cases, with some examples being slightly cross-linked, however. But deterioration by oxidation or molecular cleavage generally takes place, although this is somewhat influenced by the irradiation atmosphere. There are almost no examples in which deterioration by hardening through predominantly cross-linking, as with 1,2-polybutadiene, occurs. The cross-linking rate of 1,2-polybutadiene upon photo reaction is extremely convenient for planning the process for producing a foam, and the physical properties of 1,2-polybutadiene are suitable for use as a foam. In addition, it is presumed that, when a photosensitizing agent is added to a thermoplastic resin polymer blend system containing 1,2-polybutadiene as one component and the system is irradiated with ultraviolet light of a wavelength longer than about 254 m$\mu$, 1,2-polybutadiene undergoes prominent degree of cross-linking whereas a thermoplastic resin polymer blended therewith slightly suffers a deterioration due to oxidation or cleavage and yet substantially remains in a linear state. Therefore, such a thermoplastic resin polymer blend system after irradiation with ultraviolet light microscopically comprises a complex mixture of segments entangled in a three-dimensional structure and segments not entangled, and is considered to exhibit a comlicated viscosity behavior. That is, the present invention involves producing an open cell foam by expanding such a thermoplastic resin polymer blend system at a temperature not lower than the softening point of the 1,2-polybutadiene and that of a thermoplastic resin polymer blended therewith and within the range wherein the resin viscosity of the thermoplastic resin polymer blend system exhibits the necessary viscosity for maintaining the expansion of the cells and the shape of the cell wall (for example, about 150° to 230° C.).

The detailed machanism of the formation of the open cell foam according to the process of the present invention is still unclear. However, it is presumed that 1,2-polybutadiene in the thermoplastic resin polymer blend system is predominantly cross-linked through photosensitization thereby increasing the viscosity whereas, at the stage where the cells develop to some extent, the comparatively low viscosity of the uncross-linked other thermoplastic resin polymer blended therewith delicately acts on the opening of cells, with the total viscosity preventing a destruction and contraction of cells. It is also believed that compatibility between 1,2-polybutadiene and a thermoplastic resin polymer blended therewith, the proximity of the softening points thereof and the difference in viscosity delicately influence the viscosity behavior of the thermoplastic resin polymer blend system upon foaming.

The components used in and the procedures of the process of the present invention will be described in more detail below. 1,2-polybutadiene as referred to herein in the present invention means that which has a good heat stability and the same molding property as that of conventional thermoplastic resins. That is, the 1,2-polybutadiene has a comparatively large amount of 1,2-bonds of not less than about 70 mol% (e.g., about 70 mol% to about 98 mol%), a comparatively high molecular weight of not less than about 50,000 (e.g., about 50,000 to about 200,000), preferably 100,000 to 200,000, a comparatively low degree of crystallinity of about 10 to about 50%, and syndiotactic stereospecificity of 20% or more (e.g., about 20% to about 80%).

Any thermoplastic resin polymer that has some degree of compatibility with this 1,2-polybutadiene can be used as the thermoplastic resin polymer to be blended, with those thermoplastic resin polymers that possess a softening point which is comparatively near that of the 1,2-polybutadiene being preferred. A suitable softening point of the 1,2-polybutadiene can range from about 60° to 160° C. A suitable softening point of the thermoplastic resin polymer to be blended with the 1,2-polybutadiene is determined by the softening point of the 1,2-polybutadiene. In general, a preferable softening point of the thermoplastic resin polymer to be blended ranges from about 30° C. lower than the softening temperature of the 1,2-polybutadiene to about 30° C. higher than the softening temperature of the 1,2-polybutadiene from a standpoint of the blending operation. A suitable range for the softening point of the thermoplastic resin polymer to be blended with the 1,2-polybutadiene is about 40° C. to about 230° C. Illustrative examples include, for example, olefin resins such as polyethylene, polypropylene, polybutene, etc., vinyl copolymers such as ethylene-vinyl acetate, ethylene-vinyl alcohol, ethylene-acrylate, ethylene-propylene, propylene-butadiene, etc., butadiene copolymers such as acrylonitrile/butadiene/styrene (ABS), styrene/butadiene rubber (SBR), etc. These resins may be used individually or in combination. The proportion of 1,2-polybutadiene varies depending upon the physical and chemical properties of the thermoplastic resin polymer to be blended, such as compatibility and fluidity, but, in general, the proportion of 1,2-polybutadiene in the blend ranges from about 10 to 90% by weight, preferably 30 to 80% by weight, of the total weight of the thermoplastic resin polymer blend composition.

The kind, proportion and degree of cross-linking of 1,2-polybutadiene, difference in degree of kneading, and the like influence the apparent viscosity at the foaming temperature. In addition, the decomposition rate of the foaming agent, the gas pressure and the amount of gas generated delicately act on the opening and stabilization of the cell walls. Therefore, the open cell ratio and number, size and uniformity of cells can be appropriately selected by adroitly adjusting these factors. Physical properties of the resulting foam are greatly influenced by these factors. A suitable open cell ratio can range from about 50% to about 98% of the total void volume.

The wavelength of ultraviolet light which is employed in the present invention is about 254 to 400 m$\mu$ to which pure 1,2-polybutadiene easily responds and other pure polymers blended therewith respond with difficulty. Light in this wavelength range can easily be obtained as the main wavelength of a commercially available high pressure mercury lamp, a fluorescent lamp, a mercury lamp, a xenon lamp, etc. A suitable time for exposure to the ultraviolet light can range from about 30 seconds to about 20 minutes, preferably 1 to 10 minutes.

Those photosensitizing agents which are sensitized at this wavelength region to cause a cross-linking of the 1,2-polybutadiene are selected. The photosensitizing agent must be excited by the energy it has absorbed, and transfer this energy to the polymer to activate and predominantly cross-link the 1,2-polybutadiene while controlling the decomposition reaction as low as possible.

In general, photosensitizing agents for polymer compounds can be roughly classified into four groups: triplet sensitizing agents; transition metal compounds; radical-producing agents; and easily photo-oxidizable materials. Of the compounds which have a photosensitizing action, those which mainly accelerate oxidative deterioration or those which themselves are harmful, bad-smelling and strongly colored cannot be practically used. Since uniform cross-linking is necessary for forming an expanded product, the photosensitizing agent must have a good affinity for the resins. That is, those photosensitizing agents which are oleophilic are preferred.

Of the above classified photosensitizing agents, those which meet the requirements of the present invention comparatively often belong to the group of triplet sensitizing agents but all can be used. More specifically, aromatic ketones such as benzophenone, p,p'-dimethoxybenzophenone, p,p'-dichlorobenzophenone, p,p'-dimethylbenzophenone, acetophenone, acetonaphthone, benzyl, fluorenone, benzoin methyl ether, benzoin ethyl ether, etc., provide good results. Benzophenone and benzoin ethyl ether are particularly preferred. Other examples which can be used include aromatic aldehydes such as terephthalaldehyde, etc., and aromatic compounds of quinone series such as methylanthraquinone, etc. These photosensitizing agents are used in an amount of about 0.1 to 3% by weight, preferably 0.3 to 1% by weight, based on the total resin amount. If less than about 0.1% by weight is used, a comparatively long time is required for sensitization, and further a sufficient increase in viscosity cannot be attained. If more than about 3% by weight is used, the cross-linking of 1,2-polybutadiene proceeds to too great an extent or post-cross-linking will occur later with unreacted sensitizing agent and hardening deterioration by light will occur very quickly. That is, the photosensitizing agent is to be added in such an amount that almost all of it will be consumed in the cross-linking of 1,2-polybutadiene to provide the necessary viscosity for producing an open cell foam.

The total amount of energy of the ultraviolet light having such a wavelength distribution irradiated to a particular point will vary depending upon the wavelength distribution and the distance of the point from the light source (ultraviolet lamp). The intensity of the ultraviolet light irradiated on a certain point of the article to be irradiated is not a function of the light energy emitted from a certain point of the light source. Generally, the intensity of the ultraviolet light is indicated by an intensity distribution curve where ultraviolet light having a certain wavelength can be represented as an irradiation plane. The photosensitizing agent and the thermoplastic resin polymer photochemically respond to the light. The photochemical reaction is naturally influenced by the wavelength distribution and light strength. It is difficult to specifically determine at what wavelength energy the photochemical reaction responds. An experimental example is given below. When a thermoplastic resin polymer containing a photosensitizing agent in the above-described concentration is irradiated with light of a wavelength of 365 m$\mu$ and an ultraviolet strength of about 10 to 150 w/m$^2$, a thermoplastic resin polymer blend system having, as a total, a suitable viscosity for forming an open cell foam can be obtained, in a short time of within about 20 minutes. Adjustment of the viscosity in such a short time is achieved by using the photosensitizing agent, whereby a highly productive process for continuous cross-linking and foaming can be planned and practiced.

In order to uniformly blend the thermoplastic resin polymers, the blending must be conducted at a temperature higher than the softening point of each thermoplastic resin polymer in the blend. This uniform blending is an extremely important factor for producing a uniform open cell foam with sure reproducibility. The blending can be carried out using, for example, an extruder having a single screw or a double screw. The temperature in one zone of the cylinder thereof is set at a temperature of about 30° to 50° C. higher than the softening point of the thermoplastic resin polymers to be blended. The blending can be carried out 1 to 3 times until uniformity is achieved. As the foaming agent, those which have a decomposition point higher than the softening point of 1,2-polybutadiene and that of a thermoplastic resin polymer to be blended therewith are used. However, since cross-linked 1,2-polybutadiene exhibits a suitable viscosity for foaming at about 150° to about 230° C., those foaming agents which have a decomposition point within this range are preferred.

There are no serious problems when the softening point of the thermoplastic resin polymer to be blended therewith is lower than that of 1,2-polybutadiene. However, when the softening point of the thermoplastic resin polymer to be blended is considerably higher than the softening point of 1,2-polybutadiene, a comparatively high proportion of thermoplastic resin polymer blended therewith results in severe temperature control being required upon preparation of the compound since the kneading temperature and the decomposition point of the foaming agent approach each other.

Commonly used foaming agents such as azodicarbonamide, dinitrosopentamethylenetetramine, p-toluenesulfonylhydrazide, p,p'-oxybis(benzenesulfonylhydrazide), etc., can be employed as the foaming agent. In addition, mutual mixing or addition of a foaming aid, a foam nucleating agent or the like can be utilized. The amount of the foaming agent used can be varied depending on the amount of gas generated by the foaming agent used and the expansion ratio required. Generally, the amount of the foaming agent employed ranges from about 5 to about 25 wt% based on the total weight of blended thermoplastic resin polymer composition.

Other compounding agents which can be used include common auxiliary additives such as an antioxidant, a colorant, a filler, a lubricant, and the like. The actual foaming temperature is decided depending upon the compounded thermoplastic resin polymer blend system. From experimental experience, good results can be obtained by thermally decomposing the foaming agent at a temperature slightly higher than the decomposition temperature, the foaming agent being decomposable at a temperature higher than the softening point of the thermoplastic resin polymer by about 30° to about 100° C. which thermoplastic resin polymer has a higher softening point than that of any other blended thermoplastic resin polymer.

Within the above-described conditions, an open cell foam can be continuously produced by adding a photosensitizing agent, a foaming agent and, if desired, other additives, to the thermoplastic resin polymer blend system of 1,2-polybutadiene with a thermoplastic resin polymer, feeding such to a conventional kneader, forming the material into a desired shape such as a sheet or another specific form at a temperature higher than the softening point of the thermoplastic resin polymers and lower than the decomposition point of the foaming agent used, then suitably irradiating the molding with ultraviolet light to cross-link the 1,2-polybutadiene, and foaming and expanding the material at a temperature higher than the softening point of 1,2-polybutadiene and that of the thermoplastic resin polymer blended therewith and higher than the decomposition point of the foaming agent.

The compounded composition of the present invention can be subjected to other molding processes such as injection molding, blow molding, elongation molding, vacuum molding, and the like without deviating from the principle of the present invention. In addition, multilayer extrusion or laminating with a non-foamable resin is also possible. In such a case, the open cell ratio, the cell size, the expansion ratio and the hardness of the resulting foam can delicately be adjusted by selecting the kind and the blending proportion of the polymer blended therewith, the kind and the amount of foaming agent, the degree of ultraviolet light cross-linking and the foaming temperature. For example, highly expanded products with an expansion ratio of 5 to 30 times, more generally 20 or more times, can easily be produced.

The thus obtained open cell foam has a slightly improved solvent resistance due to cross-linking. Also, when the proportion of 1,2-polybutadiene is high, the resulting foam has a photodegradable property, the degree of which varies depending upon the proportion thereof. In addition, the foam product can be applied to the same uses as that of conventional open cell foams, such as a cushioning material, a sound-absorbing material, a filter material, and the like. Further, various uses can be found utilizing the physical and chemical properties of each of the 1,2-polybutadiene and a thermoplastic resin polymer blended therewith, the open cell ratio and the cell size.

The present invention will now be illustrated in more detail by the following Example. Unless otherwise indicated herein, all parts, percents, ratios and the like are by weight.

EXAMPLE 1,2-polybutadiene was kneaded with polyethylene, ethylene-vinyl acetate copolymer or ethylene-α-olefin copolymer elastomer in the proportion given in Table 2, using an extruder. The temperature distribution upon extrusion was $C_1$ 80° C. (feed zone); $C_2$ 110° C. (compression zone); $C_3$ 160° C. (metering zone); and D 160° C. (die temperature). The thus kneaded resin mixture was opaque upon melting.

Then, the thus blended thermoplastic resin polymers were kneaded with a foaming agent and a photosensitizing agent in the amounts given in Table 2 using a two roll mill to produce a coarse sheet of a thickness slightly thicker than 2 mm. The roll temperature was about 70° to 85° C. Then, in order to adjust the surface condition, the sheet was placed in a metal mold and heat-pressed into a 2 mm-thick sheet with a press temperature of 95° to 110° C. Each side of this sheet was irradiated with a 1 kw high pressure mercury lamp (H4000/3 made by Tokyo Shibaura Electric Co., Ltd.; main wavelength: 365 mμ; wavelength region of ultraviolet light: about 254-400 mμ) spaced at a distance of 30 cm. Then, the surface of the sheet was heated to 170° to 220° C. by heating with an infrared lamp to obtain an open cell foam. The apparent density, expansion ratio, open cell ratio and the like are shown in Table 2 below. The open cell ratio was measured using an air-pycnometer (ASTM D2856). According to this process, only open cells continuous to the surface are measured, and open cells within the samples are not measured, the latter being included in the void ratio. The resins, photosensitizing agents and foaming agents used in this Example were as follows.

(a) 1,2-Polybutadiene: trade name: JSR RB810 (made by Japan Synthetic Rubber Co., Ltd.); specific gravity: 0.901; MI (ASTM D1238): 3; Tm (DSC method): 75° C.

(b) Polyethylene: M-2270S (made by Asahi Dow Ltd.); specific gravity: 0.922

(c) Ethylene-Vinyl Acetate Copolymer: trade name: Ultrathene (made by Toyo Soda Manufacturing Co., Ltd.); UE: 634; specific gravity: 0.949; vinyl acetate content (VAC): 26 mol%; MI (ASTM D1238-65T): 4.0; Tm: 81° C.; UE: 631; specific gravity: 0.941; VAC: 20 mol%; MI (ASTM D1238-65T): 1.5; Tm: 92° C.

(d) Ethylene-α-Olefin Copolymer Elastomer: trade name: Tafmer (made by Mitsui Petrochemical Industries, Ltd.), A 4085; specific gravity: 0.89; MI (ASTM D1238-190° C.): 4.0;

P 0680; specific gravity: 0.88; MI (ASTM D1238-190° C.): 0.44

(e) Photosensitizing Agent

| Agent | Triplet Energy (ET) (KCal/mol) |
|---|---|
| Benzophenone | 68.5 |

-continued

| Agent | Triplet Energy (ET) (KCal/mol) |
|---|---|
| Benzyl | 62 |
| 9-Fluorenone | 53 |

-continued

| | Decomposition Temperature (° C) | Amount of Gas Produced (ml/g) |
|---|---|---|
| Compound C | 150 | 155 |

Table 2 (A)

| No. | RB810 (parts by weight) | Blended Thermoplastic Resin Polymer Kind | Amount (parts by weight) | Photosensitizing Agent Kind | Amount (parts by weight) | Irradiation Time (min) |
|---|---|---|---|---|---|---|
| 1 | 90 | Polyethylene M-2270S | 10 | Benzophenone | 0.5 | 4 |
| 2 | 30 | " | 70 | " | " | 6 |
| 3 | 70 | EVA, UE 631 | 30 | Benzyl | 0.3 | 8 |
| 4 | 70 | " | 30 | Benzophenone | 0.5 | 4 |
| 5 | 50 | " | 50 | " | 0.5 | 6 |
| 6 | 30 | " | 70 | " | 0.5 | 15 |
| 7 | 30 | " | 70 | " | 0.5 | 4 |
| 8 | 10 | " | 90 | " | 0.5 | 6 |
| 9 | 90 | EVA, UE 634 | 10 | Benzophenone | 0.5 | 4 |
| 10 | 70 | " | 30 | " | 0.5 | 6 |
| 11 | 50 | " | 50 | " | 0.5 | 4 |
| 12 | 30 | " 634 | 70 | " | 0.5 | 6 |
| 13 | 30 | " | 70 | " | 0.5 | 4 |
| 14 | 30 | " | 70 | 9-Fluorenone | 1.0 | 3 |
| 15 | 70 | Ethylene-α-Olefin Copolymer TAFMER A-4085 | 30 | Benzophenone | 0.5 | 4 |
| 16 | 70 | TAFMER P-0680 | 30 | " | 0.5 | 4 |
| 17 | 50 | " | 50 | " | 0.5 | 6 |
| 18 | 50 | " | 50 | " | 0.5 | 15 |
| 19 | 30 | " | 70 | " | 0.5 | 4 |
| 20 | 100 | — | 0 | " | 0.5 | 4 |

Table 2 (B)

| No. | Foaming Agent Kind | Amount (parts by weight) | Foaming Conditions Temp. (° C) | Time (min) | Expansion Ratio | Apparent Density (g/cc) | Void Ratio (%) | Open Cell Ratio (%) |
|---|---|---|---|---|---|---|---|---|
| 1 | A | 15 | 220 | 1 | 17.4 | 0.052 | 94 | 79 |
| 2 | A | 15 | 220 | 1 | 16.7 | 0.055 | 94 | 83 |
| 3 | A | 15 | 200 | 2.5 | 19.4 | 0.047 | 95 | 81 |
| 4 | B | 15 | 200 | 2 | 21.2 | 0.043 | 95 | 83 |
| 5 | B | 15 | 200 | 2 | 23.0 | 0.040 | 96 | 87 |
| 6 | B | 15 | 200 | 2 | 26.5 | 0.035 | 96 | 90 |
| 7 | B | 15 | 200 | 2 | 22.1 | 0.042 | 95 | 79 |
| 8 | A | 15 | 220 | 2 | 23.4 | 0.040 | 96 | 80 |
| 9 | A | 10 | 220 | 1 | 11.5 | 0.079 | 91 | 84 |
| 10 | B | 15 | 200 | 2 | 17.6 | 0.052 | 94 | 83 |
| 11 | B | 15 | 200 | 2 | 20.6 | 0.045 | 95 | 83 |
| 12 | A | 15 | 220 | 1 | 23.4 | 0.040 | 96 | 82 |
| 13 | C | 20 | 170 | 3 | 22.3 | 0.042 | 96 | 80 |
| 14 | B | 15 | 200 | 2 | 18.0 | 0.052 | 95 | 78 |
| 15 | B | 15 | 200 | 2 | 20.4 | 0.044 | 95 | 83 |
| 16 | B | 15 | 200 | 2 | 17.9 | 0.050 | 94 | 84 |
| 17 | B | 15 | 200 | 2 | 16.8 | 0.053 | 94 | 83 |
| 18 | B | 15 | 200 | 2 | 10.7 | 0.083 | 90 | 87 |
| 19 | B | 15 | 200 | 2 | 16.1 | 0.055 | 94 | 84 |
| 20 | A | 10 | 220 | 1.5 | 11.0 | 0.082 | 91 | 21 |

(f) Foaming Agent:
A foaming agent mixture of azodicarbonamide with p,p'-oxybis(benzenesulfonylhydrazide) was used.
The decomposition temperature and the amount of gas produced are shown below.

| | Decomposition Temperature (° C) | Amount of Gas Produced (ml/g) |
|---|---|---|
| Compound A | 190 | 175 |
| Compound B | 170 | 170 |

The results given in Table 2 sufficiently demonstrate the present invention. That is, foam product No. 20 containing only 1,2-polybutadiene has a low open cell ratio of about 20%, and is basically a closed cell foam. On the other hand, the thermoplastic resin polymer blend system of the present invention showed a high open cell ratio of 80 to 90% with a stable reproducibility, thus being clearly an open cell foam. As is shown by the expansion ratio, the gas efficiency of the foaming agent is as high as about 80 to 100% based on the theoretical amount. Thus, foam products having a high expansion ratio of 20 or more can easily be obtained. In addition, the blending ratio can be changed widely, whereby the physical and chemical properties of the resulting foam can be appropriately changed. Thus, the process of the present invention has been demonstrated to be an excellent process for providing many advantages and true industrial practicality.

While the invention has been described in detail and with reference to specific embodiments thereof, it will be apparent to one skilled in the art that various changes and modifications can be made therein without departing from the spirit and scope thereof.

What is claimed is:

1. A process for producing an open cell foam, wherein the open cell ratio ranges from about 50% to about 98% of the total void volume, which comprises irradiating a thermoplastic resin polymer blend composition comprising (a) a thermoplastic resin polymer blend including 1,2-polybutadiene, wherein the thermoplastic resin polymer responds with difficulty to an ultraviolet wave length of about 254 to about 400 mµ, the 1,2-polybutadiene being present in an amount of about 10 to about 90% by weight to the total weight of 1,2-polybutadiene and blended thermoplastic resin polymer, the 1,2-polybutadiene having not less than about 70 mol% 1,2-bonds, a molecular weight of not less than about 50,000, a degree of crystallinity of about 10 to about 50%, and a syndiotactic stereospecificity of 20% or higher, (b) a photosensitizing agent and (c) a thermally decomposable foaming agent with ultraviolet light of a wavelength of about 254 to about 400 mµ to cross-link the 1,2-polybutadiene, and subsequently foaming the composition at a temperature higher than the softening point of the 1,2-polybutadiene and that of the thermoplastic resin polymer blended therewith and higher than the decomposition temperature of the foaming agent.

2. The process of claim 1, wherein said thermoplastic resin polymer blended therewith is a polyolefin, a vinyl copolymer, or a butadiene copolymer.

3. The process of claim 2, wherein said polyolefin is polyethylene, polypropylene or polybutene, said vinyl copolymer is an ethylene-vinyl acetate copolymer, an ethylene-vinyl alcohol copolymer, an ethylene-acrylate copolymer, an ethylene-propylene copolymer or a propylene-butadiene copolymer, and said butadiene copolymer is an acrylonitrile-butadiene-styrene copolymer or a styrene-butadiene rubber copolymer.

4. The process of claim 1, wherein said photosensitizing agent is an aromatic ketone, an aromatic aldehyde or an aromatic quinone.

5. The process of claim 1, wherein said photosensitizing agent is present in an amount of about 0.1 to 3% by weight based on the total weight of 1,2-polybutadiene and blended thermoplastic resin polymer.

6. The process of claim 1, wherein said thermally decomposable foaming agent is azodicarbonamide, dinitrosopentamethylenetetramine, p-toluenesulfonylhydrazide, or p,p'-oxybis(benzenesulfonylhydrazide).

7. The process of claim 1, wherein the thermally decomposable foaming agent is present in an amount of about 5% to about 25% by weight based on the total weight of 1,2-polybutadiene and blended thermoplastic resin polymer.

8. The process of claim 1, wherein said irradiating with ultraviolet light is for about 30 seconds to about 20 minutes.

9. The process of claim 1, wherein said foaming of the thermoplastic resin polymer blend composition is at a temperature higher than the softening point of the 1,2-polybutadiene and that of the thermoplastic resin ploymer blended therewith by about 30° to about 100° C.

10. The process of claim 1 wherein the thermoplastic resin polymer has a softening point ranging from about 30° C. lower than the softening temperature of the 1,2-polybutadiene to about 30° C. higher than the softening temperature of the 1,2-polybutadiene.

* * * * *